United States Patent [19]
DuBose et al.

[11] 3,719,913
[45] March 6, 1973

[54] VISCOUS STRAIN GAGE

[75] Inventors: Charles R. DuBose; Harvey A. Jessup, both of Waco, Tex.

[73] Assignee: North American Rockwell Corporation, El Segundo, Calif.

[22] Filed: May 2, 1969

[21] Appl. No.: 821,208

[52] U.S. Cl. ....................................338/2, 338/114
[51] Int. Cl. ...............................................G01b 7/18
[58] Field of Search ............338/2, 3, 5, 114; 73/88.5

[56] References Cited

UNITED STATES PATENTS

| | | | |
|---|---|---|---|
| 2,734,978 | 2/1956 | Bulgin | 338/114 |
| 2,344,642 | 3/1944 | Ruge | 338/3 E X |
| 2,621,276 | 12/1952 | Howland | 338/2 E X |
| 3,089,107 | 5/1963 | Dean | 338/2 E X |

*Primary Examiner*—Benjamin A. Borchelt
*Assistant Examiner*—R. Kinberg
*Attorney*—William R. Lane and Thomas S. MacDonald

[57] ABSTRACT

Metal particles are suspended in an elastomeric compound to produce a conductive strain gage element capable of high elongation which responds with electric signals proportionate to the strain being measured, which strain element is mounted on an elastomeric carrier and encapsulated in a rubbery mass for protection.

4 Claims, 3 Drawing Figures

PATENTED MAR 6 1973
3,719,913
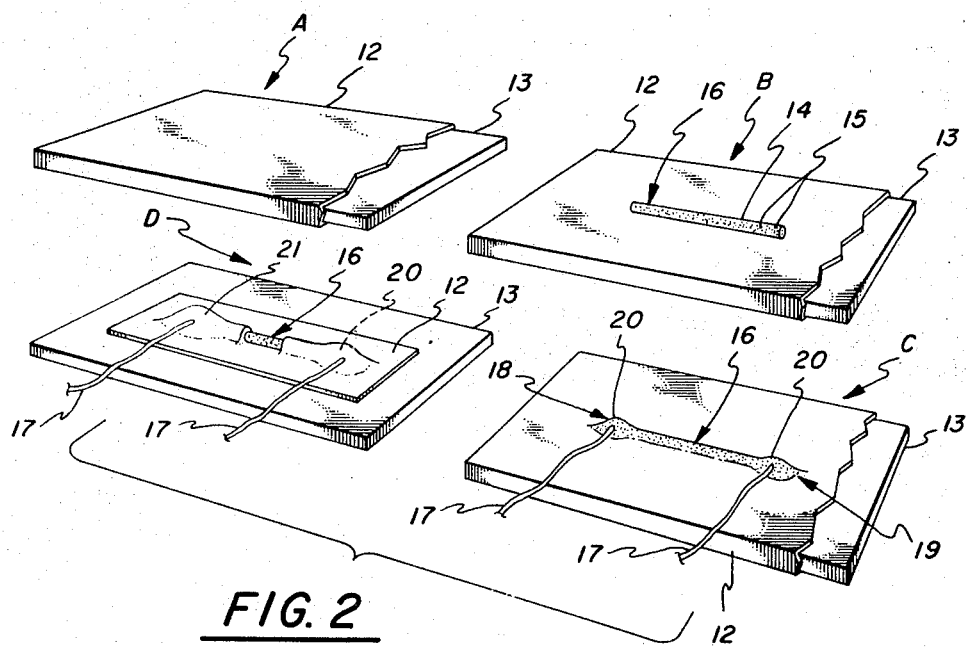
FIG. 2
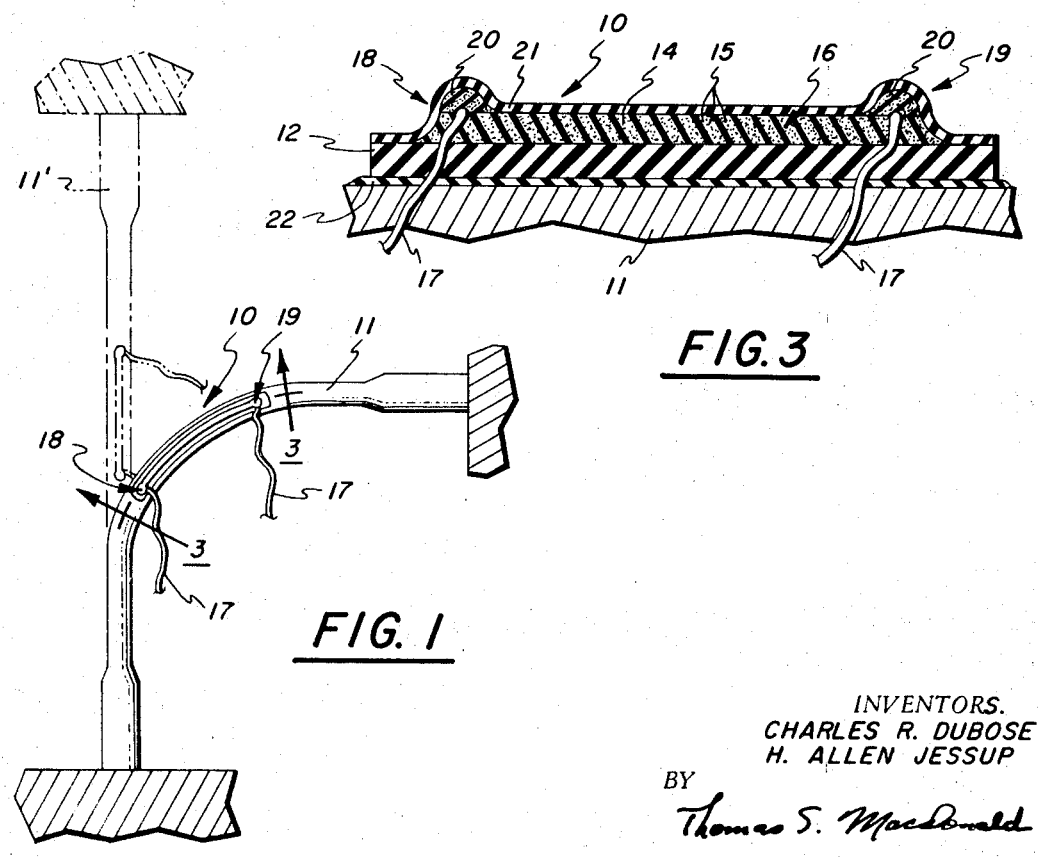
FIG. 3
FIG. 1
INVENTORS.
CHARLES R. DUBOSE
H. ALLEN JESSUP
BY
Thomas S. MacDonald
ATTORNEY

VISCOUS STRAIN GAGE

BACKGROUND OF THE INVENTION

State of the art strain gages, for the most part, are satisfactory where limited stresses are to be measured or monitored. For example, mild expansions and contractions of certain types of metals can be accommodated by a semi-rigid resistive type of strain gage. However, a problem exists when movement is to be monitored in a material wherein the material expands or contracts more than a small percent of its original size. Certain types of ductile metals can be elongated from 10 to 50 percent before failure, for example, aluminum, cobalt, copper, lead, nickel, gold, silver, platinum, tin, titanium, zirconium and their respective alloys plus hafnium, thorium, depleted uranium and vanadium. Prior art foil resistance strain gages normally have a maximum elongation of about 10 percent. A few high elongation strain gages have been developed with limited success. A metallic liquid type strain gage (U.S. Pat. No. 3,304,528) utilizes mercury as the conductive sensing element. Mercury is extremely temperature sensitive and becomes a solid at a relatively mild cold temperature and tends to "gas off" or separate at a mild high temperature causing a loss of electrical continuity. Therefore, the gage has a very narrow environmental tolerance which severely limits its application. Another type of high elongation gage (U.S. Pat. No. 3,124,769) is a helical type gage wherein the sensing element is disposed on one or both sides of a helical support coil. This type of gage, while it lends itself to high elongation when compared to the semi-rigid gage, still is limited in its application due to its relative bulkiness and the difficulty in calibration of the device. Still another type of gage designed for high elongation is known as a flexible strain gage, (U.S. Pat. No. 3,205,464) and the object is to measure a small segment of the strain since the basic gage is incapable of high elongation. The problem again is the difficulty in calibration.

Therefore, it is an object of this invention to provide a high elongation strain gage.

More specifically, it is an object of this invention to provide a viscous strain gage of low modulus capable of an elongation of approximately 100 percent or more of its basic length which varies in electrical resistance proportionate to its length.

SUMMARY OF THE INVENTION

The viscous strain gage of this invention is a composite structure made up of the following materials; a first layer of a low modulus non-conductive polymer compound acts as a gage carrier providing a base for a bead of an elastomeric gage-forming compound. The gage forming compound comprises a natural or synthetic rubber thoroughly impregnated with a quantity of conductive metal particles, such as a noble metal, throughout its length. Conductive wires are attached to both ends of the gage so that the gage can be connected to suitable electrical strain measuring instrumentation. Finally, the entire gage is encapsulated with a rubbery compound of low modulus to protect the gage.

Advantage of the highly sensitive gage over the prior art is the capability of 100 percent elongation, its insensitivity to ambient temperature variations and the ability to measure large strains on elastomers without appreciably changing the elastic modulus of the elastomer.

DESCRIPTION OF THE DRAWINGS

The above noted objects and further advantages of the instant invention will be more fully understood upon study of the following detailed description in conjunction with the detailed drawings in which:

FIG. 1 is a view of the strain gage attached to a test specimen which is undergoing a strain;

FIG. 2 illustrates the sequential steps in fabricating the strain gage; and,

FIG. 3 is a section taken along lines 3—3 of FIG. 1.

Referring now to FIG. 1 the viscous strain gage generally designated as 10 is fastened to a workpiece or test specimen 11 that is to be subjected to a strain. The gage is fastened to the workpiece along its entire length by suitable means such as an adhesive type of rubber cement 22 (FIG. 3). The workpiece 11 is shown in two positions in the illustration. The test specimen 11' is shown at rest in phantom line and in a strained condition in solid line 11. The specimen can be constructed of any material from a high to a relatively low modulus for example, from steel to plastic. Strain can be measured accurately on relatively low modulus material by gage 10 because the gage structure itself is so weak that it cannot change the modulus of the test specimen. The relative rigidity of prior art strain gages inherently changes the strain imparted to the specimen which results in inaccurate specimen responses. As can be seen, the workpiece 11 is bowed severely causing a large lateral displacement along the length of the strain gage 10. The displacement is measured resistively and signals indicative of resistive values are conducted from the gage by electrical wires 17 at opposite ends of the gage. The wires are connected to instrumentation (not shown) which records or measures the changes in resistance of the gage. The strain transmitted from the specimen 11 to the gage 10 varies proportionately as a function of the length of the gage. Normally a conventional Wheatstone bridge arrangemen may be employed as part of the instrumentation.

Examples of non-metallic material that can be strain tested by the present invention include the following; any of the elastomer or rubber compounds that are used to manufacture rubber products such as tires, tubes, gaskets, bushings, as well as solid rocket propellant motors found in the aerospace industry. Flexible plastics can be strain tested by the low modulus gage 10, for example; polyethylene, acrylonitrile-butadiene-styrene resin, polyacetal, polyallomer, chlorinated polyether, chlorinated polyvinyl chloride epoxy, nylon, polypropylene olefin copolymer, polystyrene, polyvinyl alcohol, polyvinyl butyral, polyvinyl formal and polyvinyl chloride compounds.

FIG. 2 is a perspective view of the various stages of fabrication of the preferred embodiments of the invention from stage A through D.

The first stage A consists of dipping a sand blasted glass microscope slide mandrel 13 in Heveatex L-266 latex solution. Heveatex L-266 latex is a commercially available product of Heveatex Company, a Division of the Firestone Tire and Rubber Company. The compound is a prevulcanized latex compound manufactured by heating natural latex in the presence of zinc oxide, sulfur accelerators and antioxidants. The compound is as follows:

| | Parts by Weight |
|---|---|
| Natural rubber (60% solids ammonia-preserved latex, LA type) | 617 |
| Polyethylene oxide condensate (20% solids) | 0.25 |
| Potassium hydroxide (10% water solution) | 2.5 |
| Sulfur (50% solids) | 5 |
| Zinc diethyl dithiocarbonate (50% solids) | 2 |
| Zinc oxide (50% solids) | 1 |
| Liquid phenolic antioxidant (40% solids) | 3 |

The above constituents are used (where the % solids is indicated) in the form of water dispersions.

By dipping the slide 13 into the above described compound of liquid latex, a coating of approximately 0.010 inches is obtained which is the gage carrier 12. The dipped mandrel 13 supporting carrier 12 is then air dried generally for 8 to 25 hours at 70° to 75° F to drive off water. The carrier 12 is now ready for the second stage B wherein the active gage element is prepared. The active gage generally designated as 16 consists of, for example, 50 parts of Heveatex L-266 (14) having dispersed therein 150 parts of 340 mesh silver powder 15 (99.99 percent pure) plus 50 parts of a 10% ammonia in water solution. The metal particles can be from a mesh size of 200 to 400 and can be a conductive metal other than a noble metal, such as nickel, lead or tin. The compound is mixed together for approximately 30 minutes to obtain thorough particle dispersion and a homogeneous mix thereby readying the conductive material 16 for final shaping. The gage 16 is then affixed to the carrier 12 thereby completing stage B. The dimensions of the gage 16 are, for example, one-half inch long, two-tenths of an inch wide by 0.020 inches thick. By keeping the completed active element relatively small, its accuracy and utility is enhanced. The heretofore described active element is a 25 ohm gage suitable for any material to be strain monitored. The 25 ohm gage 16 has an exponential resistance curve that is proportionate to the strain. The gage 16 is then affixed to the carrier 12 thereby completing stage B.

In stage C, electrical leads 17 are prepared for attaching to both ends of the gage 16 at points 18 and 19. The conductive lead wires 17 preferably are 99.99% pure silver to assure good conductivity and compatibility with the silver particles 15 in the active gage element 16. If a different base metal for the lead wires 17 is to be utilized they are treated in the following manner: The ends of the conductive leads 17 are coated with an adhesive 20 such as CHEMLOK 234, a commercially available product of the Highson Company, a Division of Lord Corporation. To assure electrical conductivity and chemical compatibility of the adhesive 20, four parts of silver particles (200-400 mesh preferred) are mixed with one part of CHEMLOK 234. The composition applied to the ends of conductive leads 17 thereby prevents possible corrosive interaction between dissimilar metals when silver particles are used in the conductive element 16. Other commercially obtainable rubber-to-metal adhesives may be employed. They typically are chlorinated elastomers with carbon black fillers, sulfur curatives and isocyanate cure accelerators. After the leads 17 are affixed to the ends 18 and 19 by the composition 20 an additional quantity of the silver-loaded adhesive is applied over the top of the leads which helps to reinforce the wire connection points.

The composite is again air dried for 8 to 25 hours at a room temperature of from 70° to 75° F to drive off the adhesive solvents.

Stage D further includes the following: the gage element 10 affixed to the glass slide mandrel 13 is immersed in HEVEATEX L-266 latex long enough to build up a protective encapsulating coating 21 of approximately 0.050 inches thick. The viscous gage element 10 is then air-dried 8 to 25 hours at an ambient temperature of from 70° to 75° F. After this initial drying period the completed gage is then placed in an oven at a temperature between 215° to 235° F for 35 to 55 minutes for curing. The gage 10 is removed from the furnace and cooled to room temperature. The gage is subsequently lifted from the slide mandrel 13 by carefully cutting the latex carrier 14 to the desired shape and peeling it from the slide. The gage is then powdered, for example, with talcum powder to keep it from sticking to itself.

The completed viscous low modulus strain gage 10 can be fastened to a workpiece or specimen to be strain tested by any number of adhesives 22, for example, latex rubber, rubber cement, or Eastman 9-10 made by EASTMAN KODAK. Of course, the adhesive is selected dependent upon the material the gage 10 must adhere to. For the most uniform results, the gage should be firmly attached to the workpiece along the entire length of the gage as shown in FIG. 3.

It is obvious that the strain gage 10 can be fabricated from different materials than used in the preferred embodiment. It is preferred that the gage carrier 12 be any elastomeric non-conductive epoxy or polymer compound which has a modulus of elasticity of at least 60 psi and less than 1,000 psi. For example, a carboxy terminated polybutadiene (U.S. Pat. No. 3,305,523 — Col.2, lines 3-9) with an amine curative and a hydrated silica filler (sold by Minnesota Mining and Manufacturing Co. under the designation EC-1949) is also suitable for the gage carrier 12 and the elastomeric compound base 14 of the active gage element 16. EC-1949 comprises 100 parts per weight polybutadiene polymer, six parts by weight of nitrilotriethyl-beta-propylene-aminobutryate and 60 parts by weight of hydrated silica.

The active gage compound 14 can be impregnated with any of the noble metals 15 for example, silver, gold or platinum alloys or other conductive metal particles. While the use of an ammonia water solution is disclosed to aid in the mixing and application of the active strain gage element other vehicles or solvents such as toluene, naphtha or a colloidal suspension of 1% lecithin in water may be employed.

The range of metal particle 15 size can be from about 5 microns to 75 microns. The preferred range is from 5 to 45. Obviously, the smaller the particle size, the more intimate the electrical contact is between particles. Finally, the encapsulating material 21 can be any non-conductive epoxy or polymer compound having the desired elastomeric properties. The proportion of metal particles in the elastomeric material forming the active gage material should be from 50 to 90 weight percent. A preferred range would be 60 to 80 weight percent of metal particles.

FIG. 3 is a section taken along lines 3—3 of FIG. 1 which clearly illustrates the different layers making up the gage 10. Starting with the test specimen 11, the gage carrier 12 is bonded along its entire length by a suitable adhesive 22 previously described. The active gage element 16 is made up of viscous carrier 14 which is impregnated with conductive particles preferably of a noble metal.

The wires 17 are coated and bonded to the element 16 by a conductive adhesive composition 20 at ends 18 and 19 followed by an encapsulating non-conductive rubbery substance 21, thereby completing the assembly. The preferred range of thicknesses of layers 12, 16 and 21 are 0.001 to 0.010 inch, 0.005 to 0.010 inch and 0.005 to 0.010 inch, respectively.

In operation, the low modulus gage 10 is capable of at least 100 percent elongation with an electrical resistive type of response proportionate to the extent of elongation of the gage. Since the gage is extremely weak when compared to the relative rigidity of the test specimen, the gage cannot significantly contribute to or interfere with the true strain emanating from the test specimen therefore the readout instrumentation will record accurate specimen responses.

Although particular embodiments have been chosen to best illustrate the advantages of this invention, it is to be understood that the scope of the invention is not to be limited thereby:

We claim:

1. A viscous strain gage comprising;
   an electrically insulative elastomeric base portion,
   a bead of an electrically conductive elastomeric compound, wherein said compound comprises from 50 to 90 weight percent of conductive metal particles, said compound being affixed to said base portion, and extending lengthwise thereof, said base portion and said elastomeric compound having a modulus of elasticity of from 60 psi to 1,000 psi, and
   electrical connection means attached at two longitudinally displaced points on said conductive compound for conducting a signal indicative of strain on said gage to a strain measuring means.

2. The invention of claim 1 wherein the conductive elastomeric compound comprises noble metal particles embedded in a latex rubber material.

3. The method of fabricating a low modulus viscous strain gage comprising the steps of;
   dipping a mandrel into a liquid elastomeric solution for a length of time to form a gage base portion,
   drying said base portion,
   mixing a quantity of conductive metal particles into liquid elastomer to form a homogeneous conductive compound,
   applying a bead of said conductive compound to said gage base portion,
   attaching a pair of electrical leads to both ends of the bead of said conductive compound with a metal-particle-containing adhesive thereby assuring electrical conductivity and compatability,
   immersing said gage base, conductive compound, conductive leads and reinforcing adhesive into a liquid elastomeric solution to provide an encapsulating layer, and,
   heating said strain gage to cure the completed gage.

4. A viscous strain gage comprising;
   an electrically insulative elastomeric base portion,
   a bead of an electrically conductive elastomeric compound affixed to said base portion, and extending lengthwise thereof, wherein said conductive compound comprises 50 parts by weight of latex, 150 parts by weight of silver powder, and 50 parts by weight of 10 percent ammonia solution, and
   electrical connection means attached at two longitudinally displaced points on said conductive compound for conducting a signal indicative of strain on said gage to a strain measuring means.

* * * * *